United States Patent [19]

Dye

[11] 4,048,746
[45] Sept. 20, 1977

[54] ELECTRONIC RODENT EXTERMINATOR

[76] Inventor: Joseph R. Dye, 25885 Stanford, Hemet, Calif. 92343

[21] Appl. No.: 676,979

[22] Filed: Apr. 14, 1976

[51] Int. Cl.$^2$ ............................................. A01M 19/00
[52] U.S. Cl. ........................................................ 43/98
[58] Field of Search ................... 43/98, 99, 112, 1, 80, 43/124; 47/1.3; 231/2 E

[56] References Cited

U.S. PATENT DOCUMENTS

| 2,783,581 | 3/1957 | Lee | 43/124 |
|---|---|---|---|
| 2,805,067 | 9/1957 | Ryan | 43/98 |
| 3,058,250 | 10/1962 | Thomas | 43/1 |
| 3,827,176 | 8/1974 | Stirewalt | 43/98 |

Primary Examiner—Warner H. Camp

[57] ABSTRACT

An electronic executing device used to demise gophers and other underground rodents in their burrows without the removal of soil including a sensitive electronic touch control probe to locate the rodents run, with means whereby the high voltage is applied only when the rodent is present, being safe to use, light-weight, completely portable and self-contained using no external power source, with means to notify operator when rodent has demised himself.

1 Claim, 2 Drawing Figures

ELECTRONIC RODENT EXTERMINATOR

BACKGROUND OF THE INVENTION

1. Field of the Invention

Burrowing rodents sometimes referred to as pocket gophers, ground squirrels and pack rats are usually eliminated by the use of traps, poison pellets or gas cylinders being placed in their burrows. Usually the method used is as dangerous to human beings as to the rodent. This invention describes a novel trap that is harmless to use, is clean and effecient. A small hole is made in the soil when it is installed and after the rodent has demised himself it is only necessary to pull the instrument from the earth and press the soil down thereby covering the hole and the remains.

2. Description of Prior Art

The Prior Art now known best is represented by U.S. Pat. Nos. of 2,783,581 Lee 3/1957, 2,805,067 Ryan 9/1957, 3,058,250 Thomas 10/1962, 3,827,176 Stirewalt 8/1974.

Although some of these patents disclose electric execution devices used primarily on rodent extermination, only Stirewalt gives the formal advocate of the principle and thus only in part. None can be said to disclose the full equivalent of applicant's invention in that none embodies all of applicant's combined elements and their combined functions such as the placement of the trap without removal of the soil and means for locating the rodents burrow by electronic means, nor does any of them disclose as being of a self contained nature without external power source, with the battery and coil being used only when the rodent is present thereby demising the rodent by high voltage, low amperage charges that would not be harmful to a person, as compared to a commercial or household source of 115 volts with a high amperage rating that could be lethal. An electric rodent exterminator suitable only around the home and garden where an electrical cord must be extended covers only a small part of the area where this type of trap is needed, there are thousands of farm acreage that is infested with rodents inflicting an enormous amount of damage yearly, these areas can best be protected by applicant's portable, self contained type of trap using no mechanical parts to rust and corrode, very little maintenance and low cost to manufacture.

SUMMARY OF THE INVENTION

This invention provides primarily, plans for an instrument or trap to be used to demise gophers and other underground rodents in their burrows by electric means, with two objectives, one in locating the rodents burrow by electronic means and causing the high voltage to flow through the rodents body at a set time using the earth as an electrical ground. The present invention recognizes the problems and difficulties of prior art devices and provides a novel electronic circuit using two transistors and a relay in the form of a touch control much the same as used in a simplified version of the lie detector, this circuit when closed by the rodents body causes the high voltage coil to energize, thus supplying the necessary electrical charge to demise the rodent. Another objective of the invention is to offer a lightweight, well balanced carrier with a curved handle at the top end making it easier to push into the soil, the lower tip end being appended with a sharp metal sleeve that pierces the ground easily and becomes the grounded electrode. Another object of the invention is to provide a switch for the purpose of finding the rodents run with means to move to kill position thereby keeping two circuits employed while in stand by position not using energy from the self contained batteries, and a further objective is to cause an alarm by visual means and a buzzing noise thereby alerting the operator.

Other objectives and advantages of the invention will become apparent as set forth in the following description.

BRIEF DESCRIPTION OF THE DRAWINGS

In the accompanying drawings forming a part of the specifications, and in which like reference characters are employed to designate like parts through out same.

DESCRIPTION OF THE PREFERRED EMBODIMENT

Figure 1:
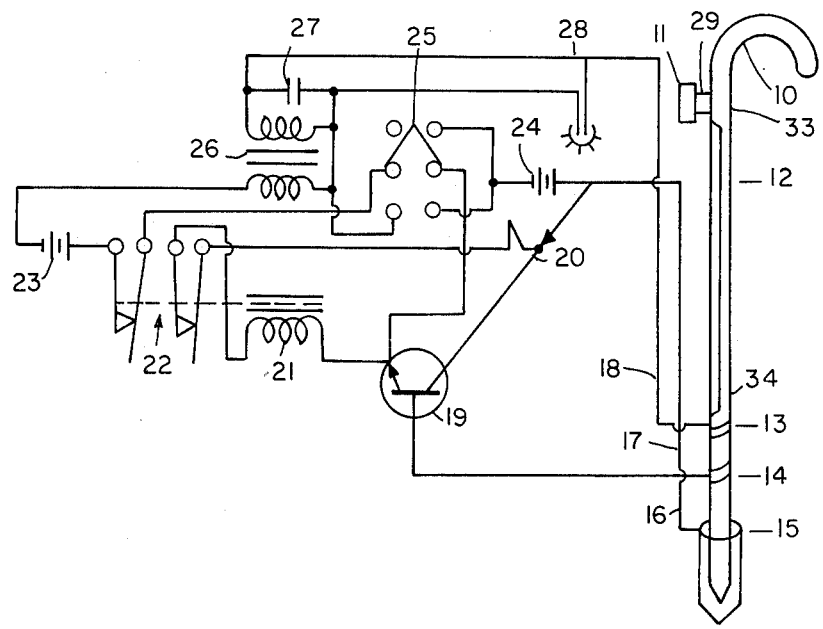
FIG. 1 is a schematic perspective view illustrating the over all application and utility of an electronic extermination device in accordance with the present invention.
Figure 2:
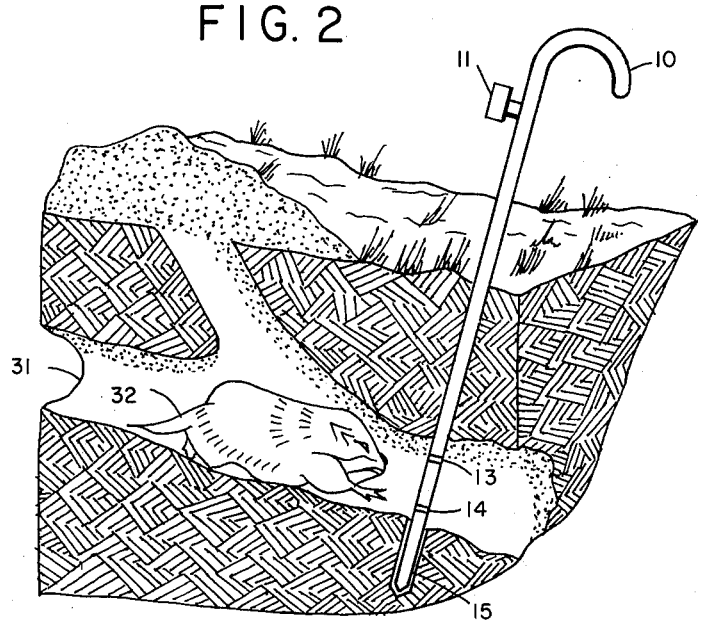
FIG. 2 is a perspective view of an electronic extermination device constructed in accordance with the present invention being shown in relation to the underground cavity and the rodent being trapped.

Referring now to drawing FIG. 1 and FIG. 2 inclusive, a first preferred form of an electronic rodent exterminator embodying the invention is illustrated and designated in its entirety by the reference numeral 10 and is comprised of a carrier, being the main supporting body for the electrical components and hardware, being constructed of hardwood and in the appearance of a walking cane, wood being used through out as it offers a preferred material, being a good insulator for the electrical components and other elements that will not deter the approach of the rodent.

The exterminator 10 is prepared for the installation of the hardware and electrical components by routing a groove 12 in the carrier one quarter inch in width by one quarter inch in depth, starting at point 33 and extending the cut to point 34, the point cut at 34 being relevent to one half the diameter of point 15. Referring to further preparation of the exterminator, the carrier 10 is routed one eighth inch deep around the circumference and one quarter inch in width at points 13 and 14 respectively. A brass ring is installed at 13 and 14 thus becoming the touch control and the high voltage electrode. A metal sleeve 15 one half inch at the top and tapering down to a point is installed over the tip of the carrier 10 at 15 and constitutes the electrical ground. Three wires 16, 17 and 18 are placed inside groove 12 and are extended from 13, 14 and 15 under the lower back part of container 11 leaving tie wires for the circuit board. Container 11 is appended to bracket 29 and thus to carrier 10 by using suitable screws. The lower ends of wires 16, 17, and 18 are fastened to the brass rings at 13, 14 and to sleeve 15 thus completing the circuitry on the carrier 10.

Referring to FIG. 1 and FIG. 2 the circuitry operation is described thus, when a rodent 32 is present between sleeve 15 and ring 14 the proper bias is provided to cause transistor 19 to conduct, when transistor 19 conducts it causes transistor 20 to conduct by placing a small negative voltage on the base, when 20 conducts it energizes relay 21 but as soon as relay 21 energizes, the collector circuit of transistor 20 is broken and the relay 21 de-energizes; this action repeats again and again which creates a buzzing noise. This noise is relay 21 vibrating, the making and breaking of the points 22 thereof also serve the purpose of energizing and de-energizing high voltage transformer 26 causing the high voltage coil 26 to become operational making the current flow into capacitor 27 in an alternating fashion terminating in high voltage at ring 13 going through the rodents body 32 to ground point 15 thereby demising the rodent and causing light 28 to give a visual alarm.

Referring again to FIG. 1 and FIG. 2. By placing switch 25 in test position, provides a simple way to locate a rodents burrow 31. The test circuit utilizes only the transistors 19 and 20 of the circuit and battery 23, the high voltage coil 26 and the 6 volt battery 24 are on stand-by. By pushing the carrier 10 the point 15 goes into the soil, eight to fourteen inches deep and the buzzer will start as point 15 and rings 13 and 14 go into the soil. As the touch control ring 14 goes through the burrow 31 the buzzer will stop, this location is in the path of rodent 32. Keeping the carrier 10 in this position, turn switch 25 to kill position and leave in that position until a rodent is present. No voltage is used until the touch control ring 14 is touched by the rodent.

Having thus described the invention with particular reference to the preferred form thereof, it will be obvious to those skilled in the art to which the invention pertains, after understanding the invention that various changes and modifications may be made therein without departing from the spirit and scope of the invention, as defined by the claims appended hereto.

What is claimed is:

1. An electronic rodent exterminator comprising:
    a carrier member having an elongated body formed from wood and provided at one end with a curved handle;
    a metellic touch control ring, a high voltage electrode, and
    a grounded metal sleeve mounted in spaced relation on the end portion of said carrier member opposite said handle end; electrical control means housed in said container and electrically connected to said control ring, electrode and sleeve; and electrical control means including first circuit means electrically connecting said grounded sleeve and said touch control ring through a pair of transistors,
    a relay, a battery and a switch for locating a burrow and second circuit means electrically connecting said grounded sleeve and high voltage electrode through a transformer a condenser, a battery and a switch for electrocuting a rodent.

* * * * *